US011438325B2

United States Patent
Begun et al.

(10) Patent No.: US 11,438,325 B2
(45) Date of Patent: Sep. 6, 2022

(54) TRUST ESTABLISHMENT BY ESCALATION

(71) Applicant: EMC IP Holding Company LLC, Hopkinton, MA (US)

(72) Inventors: Ido Begun, Givataim (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 209 days.

(21) Appl. No.: 16/804,892

(22) Filed: Feb. 28, 2020

(65) Prior Publication Data
US 2021/0273937 A1 Sep. 2, 2021

(51) Int. Cl.
*H04L 9/40* (2022.01)
*G06F 9/455* (2018.01)
*H04L 9/32* (2006.01)
*H04L 9/00* (2022.01)

(52) U.S. Cl.
CPC ...... *H04L 63/0823* (2013.01); *G06F 9/45558* (2013.01); *H04L 9/321* (2013.01); *H04L 63/0272* (2013.01); *G06F 2009/45587* (2013.01); *H04L 9/50* (2022.05)

(58) Field of Classification Search
CPC . H04L 63/0823; H04L 9/321; H04L 63/0272; H04L 2209/38; H04L 9/0894; H04L 9/3247; H04L 9/3265; H04L 63/083; H04L 2209/64; H04L 63/10; H04L 63/101; H04L 63/08; G06F 9/45558; G06F 2009/4587; H04W 12/06; H04W 12/069
See application file for complete search history.

(56) References Cited

U.S. PATENT DOCUMENTS

| 7,949,871 | B2 * | 5/2011 | Randle | H04L 63/0869 |
| | | | | 713/153 |
| 8,959,351 | B2 * | 2/2015 | Gorbach | H04L 63/0823 |
| | | | | 713/175 |
| 9,419,799 | B1 * | 8/2016 | Chung | H04L 9/3247 |
| 10,447,682 | B1 * | 10/2019 | Du Lac | H04L 9/3247 |
| 11,146,569 | B1 * | 10/2021 | Brooker | H04L 63/105 |

(Continued)

FOREIGN PATENT DOCUMENTS

GB 2392068 A 2/2004

OTHER PUBLICATIONS

"Chapter 10: Identification and Entity Authentication ED—Menezes A J; Van Oorschot PC; Vanstone SA", Handbook of Applied Cryptography; [CRC Press Series on Discrete Mathematics and Its Applications], CRC Press, Boca Raton FL, US, pp. 385-424 Oct. 1, 1996, XP001525010.

(Continued)

*Primary Examiner* — Matthew Smithers
(74) *Attorney, Agent, or Firm* — Workman Nydegger

(57) ABSTRACT

One example method includes contacting, by a client, a service, receiving a credential from the service, obtaining trust information from a trust broker, comparing the credential with the trust information, and either connecting to the service if the credential and trust information match, or declining to connect to the service if the credential and the trust information do not match. Other than by way of the trust information obtained from the trust broker, the client may have no way to verify whether or not the service can be trusted.

20 Claims, 7 Drawing Sheets

(56) References Cited

U.S. PATENT DOCUMENTS

| | | | | |
|---|---|---|---|---|
| 2005/0268090 | A1* | 12/2005 | Saw | H04L 63/0428 |
| | | | | 713/156 |
| 2006/0048131 | A1* | 3/2006 | Napier | G06F 21/57 |
| | | | | 717/168 |
| 2007/0266249 | A1* | 11/2007 | Kinser | H04L 63/062 |
| | | | | 713/173 |
| 2014/0122873 | A1* | 5/2014 | Deutsch | H04L 63/0884 |
| | | | | 713/158 |
| 2016/0173286 | A1* | 6/2016 | Gallagher | H04L 9/321 |
| | | | | 713/156 |
| 2017/0230349 | A1* | 8/2017 | Gaur | G06F 21/629 |
| 2019/0324419 | A1* | 10/2019 | Lutz | G05B 19/0425 |
| 2020/0204538 | A1* | 6/2020 | Friel | H04L 63/062 |
| 2020/0287724 | A1* | 9/2020 | Vaddi | H04L 9/3263 |

OTHER PUBLICATIONS

International Search Report and Written Opinion received for PCT Patent Application No. PCT/US21/16763, dated Mar. 30, 2021, 14 pages.

* cited by examiner

TRUST ESTABLISHMENT BY ESCALATION

FIELD OF THE INVENTION

Embodiments of the present invention generally relate to establishment of trusted communications between entities. More particularly, at least some embodiments of the invention relate to systems, hardware, software, computer-readable media, and methods for automatically establishing trust between a client and a service.

BACKGROUND

Clients such as data protection services and appliances often have a need to communicate with a service, for example, that runs on a virtual infrastructure such as a cloud site. However, communications between the client and the service may not be trusted, or secure. This may be due to various circumstances.

For example, many of the services and other entities with which the client may need to communicate have self-signed trust certificates. That is, no trusted third party has vouched for the trustworthiness of the service and, instead, the service is essentially vouching for its own trustworthiness by using a self-signed certificate. Self-signed certificates are sometimes employed as a way to avoid the time, effort, and expense, that would be involved with generating a trusted certificate or obtaining a trusted certificate from a certification authority (CA).

There are a number of typical practices that are employed where self-signed certificates are involved. For example, programmers may employ a self-signed certificate but enable users to simply ignore it. This practice is problematic however, at least because it may make the system prone to server spoofing and other hacks. In other cases, the system may be configured to ask the user to verify the self-signed certificate. While this approach may be marginally better than enabling the user to simply ignore the self-signed certificate, most users typically do not verify the certificate, or even understand what they are supposed to do when they get a message asking for verification. Further, users may have no way to determine whether or not they should trust the self-signed certificate.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
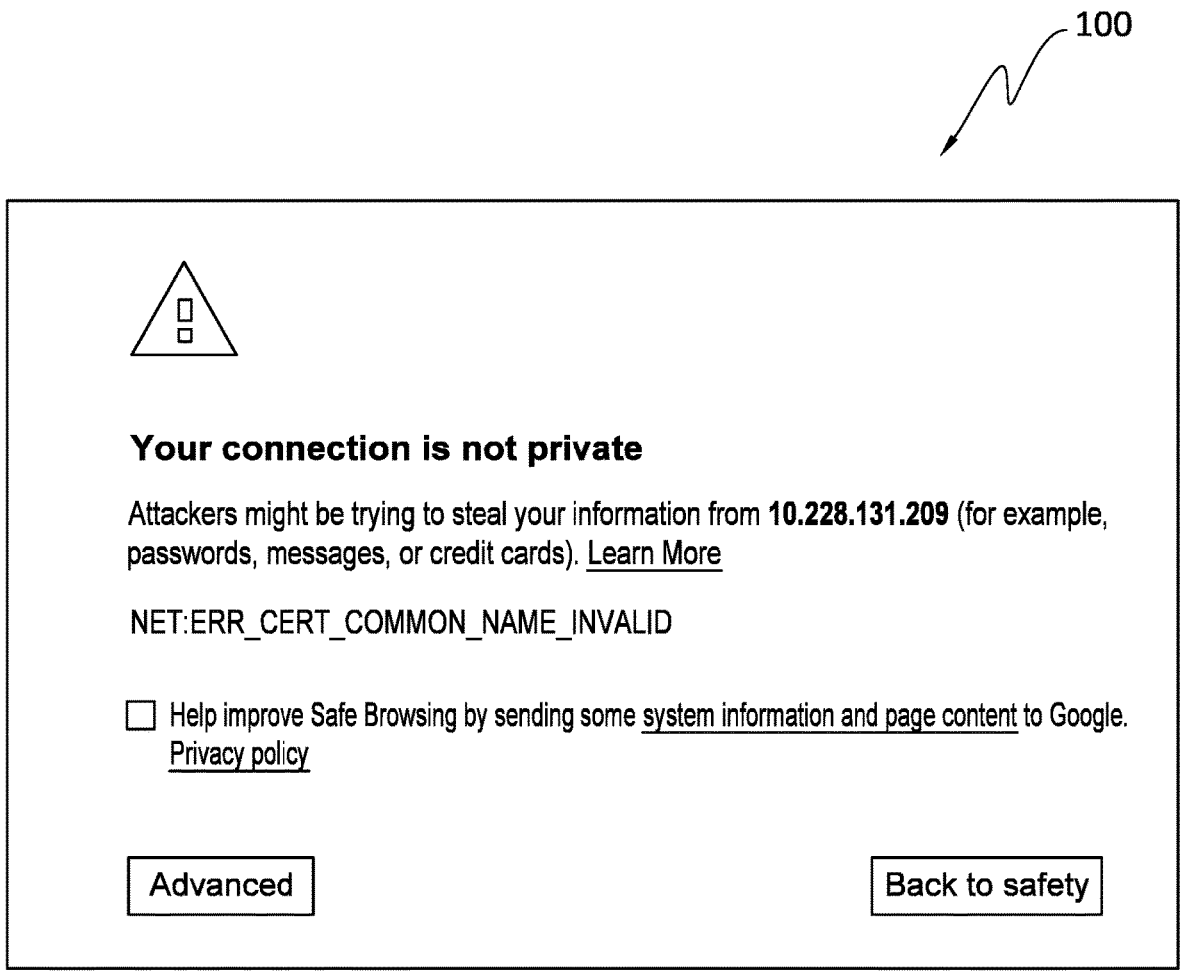
FIG. 1 discloses aspects of an example warning message.

Embodiments of the present invention generally relate to establishment of trusted communications between entities. More particularly, at least some embodiments of the invention relate to systems, hardware, software, computer-readable media, and methods for automatically establishing trust between a client and a service.

Client infrastructure such as systems, services, and components, may have a need to establish trusted and secure communications with a service, server, application, and/or other entities, that run on an infrastructure such as a virtual infrastructure. However, while the client may not have enough information, or the capability, to establish trust directly with a service, for example, of a virtual infrastructure, the client may have access, and trust, with an infrastructure management (IM) server, such as the VMware vCenter platform, which is a management utility operable to manage virtual machines (VM) from a central location, such as a cloud site for example. The IM server, in turn, may have a trusted relationship with the service with which the client wants to communicate. Thus, embodiments of the invention may, among other things, employ a trust broker (TB) that serves to leverage the trust relationship between the client and IM server, and the trust relationship between the IM server and the service, to enable the client to engage in trusted and secure communications with the service.

In one example embodiment, the TB is implemented as a service that may run on a router or as an edge service but can be on any place accessible to the client. The TB may have trusted access to the IM, such as by way of internal communication channels between the TB and IM that are not publicly accessible, and therefore, not vulnerable to malicious code and actors. The client may then access the TB via a network and can leverage the IM trust to gain access to trust information concerning the service(s) that are of interest to the client. In one example, the TB may expose an application program interface (API) that returns a certificate that corresponds to the IP address of the service. Alternate approaches are disclosed elsewhere herein. The client may then use the TB information to verify that the certificate of the service is indeed trusted. The client may then securely connect to the service.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that they may employ a trust broker (TB) that serves to leverage the trust relationship between the client and IM server, and the trust relationship between the IM server and the service, to enable the client to engage in trusted and secure communications with the service. An embodiment of the invention may enable a client to establish trusted and secure communications with a service whose trustworthiness the client may not be able to independently verify. An embodiment of the invention may avoid the need for special certificates, or customer/user involvement. An embodiment of the invention may enable a client to use a single trusted relationship, with the IM, to gain trusted access to all services managed by the IM. An embodiment of the invention may establish trusted communications with one or more services automatically without requiring a user to perform any of the operations required to establish such communications. An embodiment of the invention may avoid the need for a user to have to evaluate the trustworthiness of a certificate. An embodiment of the invention may avoid the need for a client to communicate directly with a service without the benefit of trust information concerning that service. An embodiment of the invention may reduce or eliminate the vulnerability of client-service communications that take place outside the infrastructure where the service operates.

A. Brief Overview

Following is a discussion that may enable a better understanding of aspects of some example embodiments of the invention. With reference first to identity certificates, it is noted that secure and trusted communication is a crucial practice for both organizations and individuals. In order to establish a communication channel that ensures confidentiality, information authenticity and tampering resistance, trust must be established between the peers. Such trust can be established, for example, by verifying the identity of the peers using a chain of public key certificates. In general, certificates are a mechanism of establishing trust by having a disinterested third party vouch for the identity of the certificate holder. This may be done, for example, by cryptographically signing the certificates. There may be multiple signatures that create a chain. Each certificate in the chain, starting from the certificate of the peer, may be signed by its issuer, up to the last certificate in the chain, that is, the root or topmost CA (Certificate Authority), which is always a trusted entity and whose private key is used to sign the other certificates, which then inherit the trustworthiness of the root certificate. A client may then verify the identity of its peer by verifying the certificate chain, which requires the client to trust at least one of certificates in the chain.

Because multiple certificates may be issued by a single issuer, clients such as operating systems and browsers for example, may include a trust anchor, that is, a list of root CAs. This trust anchor may be used to verify any peer with a certificate signed directly or indirectly by one of the CAs listed in the trust anchor.

For a service to be trusted by the end client, the certificate chain of the service may be signed by a trusted CA. Issuing a certificate that can be verified by a globally trusted CA may impose additional costs on the owner of the service. Further, the bureaucracies of certificate management within an enterprise may mean that some administrators skip it and use self-signed certificates for use within the enterprise. These are certificates that can be auto generated but are vouched by no one. That is, the self-signed certificates establish identities that cannot be verified. Thus, the responsibility for verification of a certificate may be shifted to the user. That is, the user may be asked to verify the certificate, but the user does not usually have the information or ability to establish the identity of the certificate issuer in another way.

With reference briefly to FIG. 1, some of the aforementioned points are illustrated by way of an example. Particularly, a warning 100 may be displayed by a client such as a browser when the browser attempts to access a website that has a self-signed certificate. The self-signed certificate may require verification by the user before access will be granted to the website. This verification may be required even though the user may not have the information necessary to do so with confidence. The user thus may have to choose between not accessing the website, or accessing the website and running a risk that doing so may expose the user system to malicious code or other problems. That is, the user must decide, without adequate information, whether or not to trust the website.

B. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Example operations may include, but are not limited to, data read/write/delete operations, data protection operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 2:
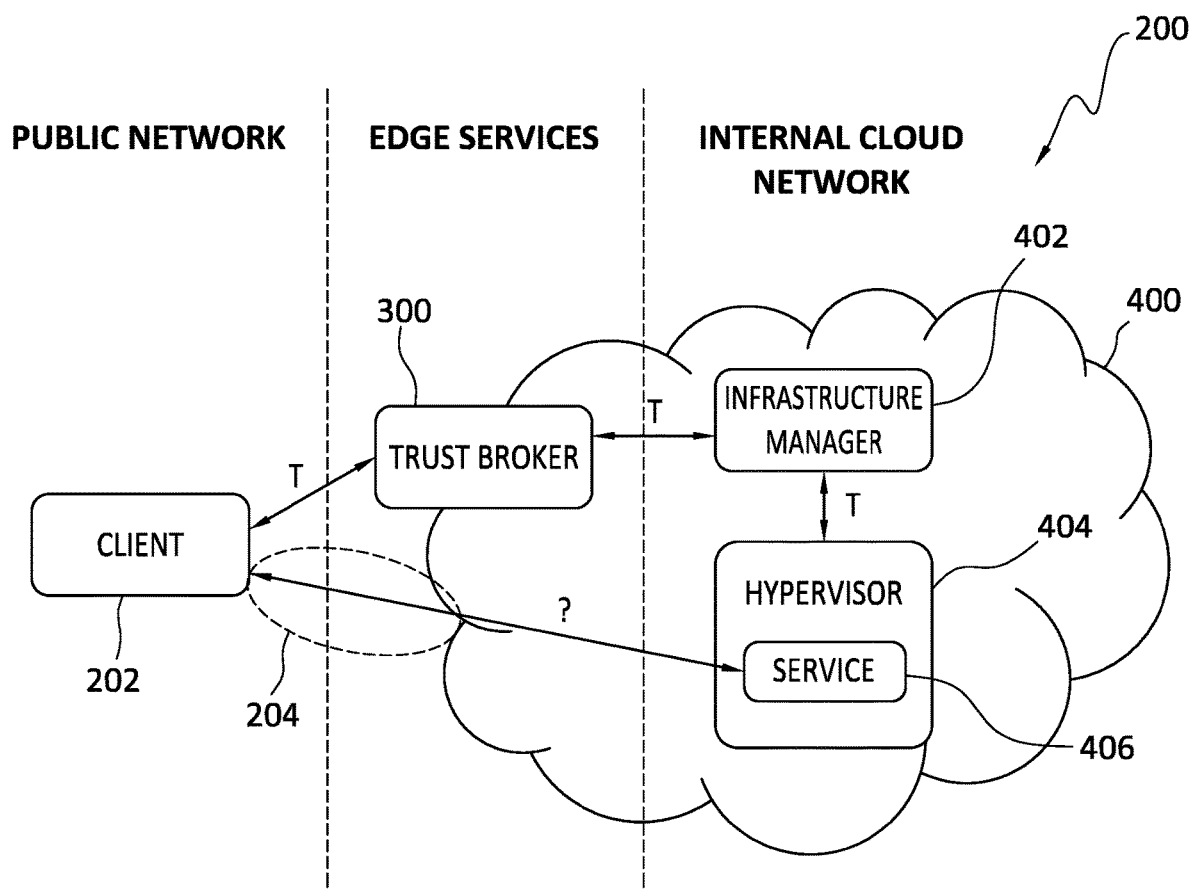
FIG. 2 discloses aspects of an example architecture and environment.

With particular attention now to FIG. 2, one example of an operating environment for embodiments of the invention is denoted generally at 200. In general, the operating environment 200 may include one or more clients 202 which may take the form, for example, of a data protection (DP) service, and DP appliance. The client 202 may be implemented as a server, hardware and/or software, a web browser, or service such as a client infrastructure service for example. As illustrated by the foregoing examples, the term 'client' as used herein is intended to be broad in scope and is not limited to any particular form or functionality. In general, a client may be any entity that may need to communicate with a service, one example of which is a cloud based service performed by one or more VMs. The client(s) 202 may operate on a network that is separate from the cloud environment 400.

The operating environment 200 may also include a trust broker (TB) 300 which is accessible by the client 202 and may, in some embodiments, be implemented as an edge service with respect to a cloud environment 400 such as a cloud computing network for example. In some embodiments, the cloud environment 400 may take the form of an internal cloud network of an enterprise, and in other embodiments, the cloud environment 400 may take the form of a public cloud computing environment, or other computing environment external to an enterprise. The scope of the invention is not limited to any particular type of cloud environment 400 however. The cloud environment 400 may also include an Infrastructure Manager (IM) 402 which may, in some embodiments, take the form of the VMware vCenter platform. The IM may communicate with a hypervisor 404 to manage the operations of one or more VMs that may each provide one or more services 406 for use by the client 202. The services 406 may comprise one or more Functions as a Service (FaaS).

A trust map is also disclosed in FIG. 2 that identifies relations that have been, or may be, established between entities. Thus, trusted relations 'T' may exist, or be established, between the client 202 and TB 300, between TB 300 and the IM 402, and between the IM 402 and the hypervisor/service 404/406. A trusted relation '?' between the client 202 and service 406 may, or may not, be established depending upon whether or not the client 202 is able to verify the service 406 using the information provided to the client 202 by the TB 300. It is noted that while the client 202 may have a trust relation with the IM 402, which in turn is able to verify the service 406, the client 202 may not necessarily have to trust the IM 402, at least not directly. For example, it may be enough for the client 202 to trust the TB 300, but not directly trust the IM 402.

The portion of FIG. 2 designated by 204 may be particularly vulnerable to attacks by middleman entities in circumstances where the client 202 attempts to connect directly with the service 406. As disclosed herein, this concern may be avoided when the client 202 communicates, whether directly or indirectly, with trusted entities by way of trusted connections. For example, portion 204 may be deemed trustworthy both when the client 202 receives a signed certificate from the service 406, or is able to verify an unsigned certificate from the service 406 using information received from the TB 300.

Some further observations are in order concerning the example of FIG. 2. In general, the IM may be a cloud management entity. In the specific case of a VMware implementation, vCenter acts as the IM. Other cloud environments such as Azure and AWS also include instances of an IM. The scope of the invention is not limited to any particular cloud environment or IM. More generally, embodiments may operate in connection with any environment that enables a client, such as client 202, to verify one or the other of an IM API, or TB.

With more particular reference now to FIG. 2, the client 202, which may be a data protection client, has the IM 402 credentials and, as such, the client 202 knows that the IM can be trusted. As well, the TB 300 may have the IM 402 credentials as well, so that the TB 300 knows that the IM 402 can be trusted. For example, the IM credentials may include a certificate that has been verified by a neutral or disinterested third party and, as such, the IM credentials may be trusted by the client 202. As well, the IM is the manager of the target service 406 for which trust is to be established. Further, as the manager, the IM 402 is aware of the IP address of the service 406, either by assignment, or by metadata exposed by the service 406. As well, as the manager, the IM 402 may gain access to the certificate of the service 406, as explained in further detail below. Additionally, the IM 402 communicates with the service 406 entirely within a network, that is, the cloud environment 400, that is managed and controlled by the IM 402. As such, the possibility of an external middle man in the communication paths of the network may be eliminated. Finally, the IM 402 may manage virtual networks, including routers/network edge servers used to access those virtual networks.

In general, and with continued attention to FIG. 2, at least some embodiments of the invention may be configured, and operate, as outlined immediately hereafter. With regard first to the TB 300, it may run on a router, or as an edge service provided by a cloud service provider for example, but can be configured in any way or place accessible to the client 202. Further, the TB 300 has trusted access to the IM 402. The client 202 may access the TB 300 via a network and may leverage the IM 402 trust to gain access to trust information. A variety of approaches may be employed in this regard.

In one example approach, the TB 300 may expose an API that returns a certificate that corresponds to the IP address of the service 406. The client 202 may then use the TB 300 information to verify that the certificate provided by the service 406 to the client 202 is indeed trusted. If verification is successful, the client 202 may connect securely to the service 406.

In another approach, the service 406 may provide a self-signed certificate which is untrusted. In this case, and since the TB 300 can know via the IM 402 that the service 406 that generated the self-signed certificate is verifiable, the TB 300 may vouch for that self-signed certificate. Thus, the API receives the self-signed certificate and vouches for it, such as by resigning the certificate or answering that the certificate with that specific signature is trustworthy.

Thus, the aforementioned approaches may be summarized as (i) "given an IP address, the certificate is provided in a trusted way" or (ii) "given the IP address and certificate, return trust verified or not." The first approach, which may be referred to herein as the "API approach," emphasizes use of a trusted certificate provided by the TB 300 to the client 202. The second approach, which may be referred to herein as "verification using the TB API," emphasizes use of an untrusted certificate, but one that is verified or verifiable by the IM 402 and thus can be vouched for by the TB 300. It is noted that these approaches are provided by way of example and are not intended to limit the scope of the invention. More generally, these and any other methods for providing trust information to a client may be referred to generally herein as a TB API process.

In more detail now, and with continued reference to FIG. 2, the TB 300 may be accessed from a public network and may have access to internal services, such as the service 406, used by a cloud service provider which may comprise, or consist of, the cloud environment 400. The TB 300 may serve as an API endpoint for retrieving the certificate of the service 406 using a secure communication channel between the TB 300 and IM 402. For example, the API takes an IP address(es) for one or more services, such as the service 406, as its input and returns, to the client 202, the service 406 certificate that the API of the TB 300 obtained in a trusted manner.

Further, the TB 300 may serve as a single trusted point of the cloud environment 400, by way of which one or more clients 202 may access services such as service 406 running in the cloud environment 400. That is, the cloud environment 400 may employ only a single TB 300 to serve multiple clients that may each be accessing multiple services hosted in the cloud environment 400. This approach may considerably simplify operations for the clients, as well as in the cloud environment 400.

When a client 202 attempts to connect to a service 406 running on one of the major cloud service provider infrastructure, such as the cloud environment 400, but cannot verify the certificate of the service 406, the client 202 may use the TB 300 to verify the otherwise untrusted certificate. By requesting the service 406 certificate from the TB 300, which has obtained the certificate in a trusted manner from the IM 402, the client 202 may verify the identity of the service 406, thereby guaranteeing a secure communication channel with the service between the client 202 and service 406.

As the foregoing indicates, communication between the client 202 and the TB 300 may be performed in a secure way. Further, the TB 300 may run as a service provided by a cloud service provider operating in connection with a cloud environment 400, and the identity of the cloud service provider may be verified by a globally trusted CA. Finally, and as noted earlier, the TB 300, which may be operating as an edge service for example, may have access to the IM 402 used by the cloud service provider. The IM 402 runs a virtual infrastructure, which may include the hypervisor 404, and manages the hypervisors 404 used to run the different services 406. As such, the IM 402 may have access to information, such as concerning the trustworthiness of the service 406, that is inaccessible from public networks. This information, coupled with a trusted relation between the IM 402 and the TB 300, and a trusted relation between the TB 300 and client 202, may thus enable the client 202 to verify, and use, the service 406.

C. Retrieval of Service Certificate

Figure 3:
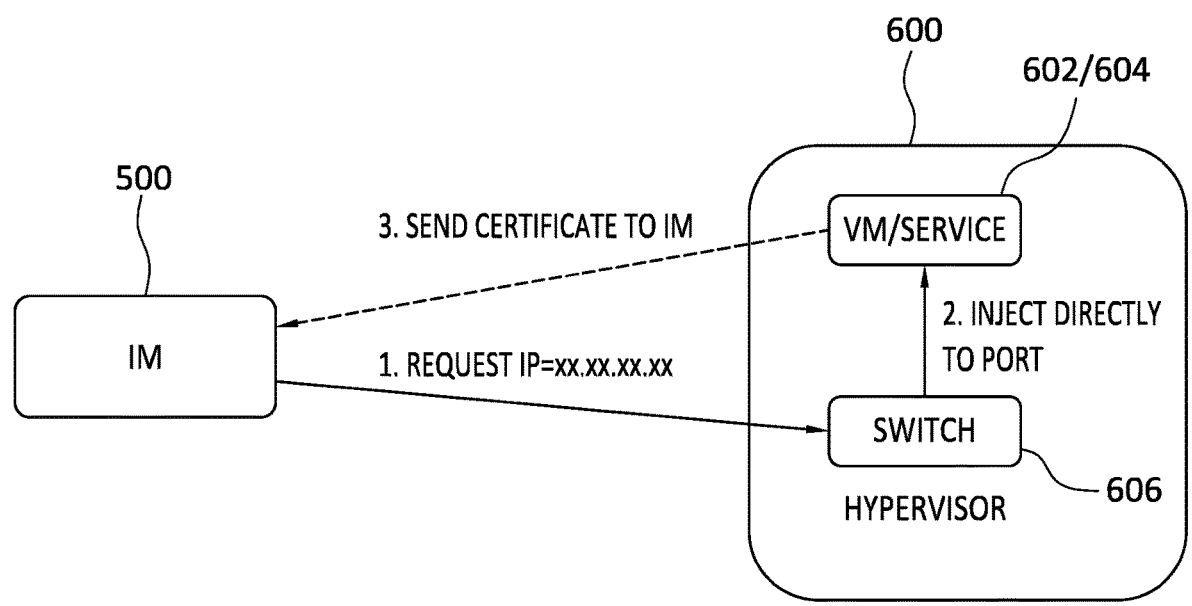
FIG. 3 discloses aspects of an example architecture for obtaining a certificate.

With continued attention to FIG. 2, and directing attention now to FIG. 3 as well, details are provided concerning systems, components, and processes for retrieving, by an IM, a certificate of a service. In the example of FIG. 3, an IM 500 is configured to communicate with a hypervisor 600 that controls the operation of a VM 602 running a service 604 to which a client (not shown) may need access. The hypervisor 600 may include a switch 606 configured to communicate with the VM/service 602/604.

In general, the IM 500 may retrieve, or otherwise obtain access to, a certificate of a service 604 in a secure manner. This retrieval or other access may be implemented in various ways. For example, the certificate may be a known certificate that was provided to the service 604 by the IM 500. Particularly, services 604 such as FaaS, cloud services, and other services may have their certificate generated and provided by the IM 500 upon instantiation of the service 604. It such cases, the IM 500 may thus have a record of the certificate.

As another example, the certificate of the service 604 may have been given to the IM 500. Particularly, in some cases, a service 604 may provide its certificate to the IM upon deployment of the service 604 in a cloud network or other environment. For example, a load balancer service may get a certificate supplied by DevOps of the system. The certificates may be installed via APIs that may go through the IM 500, and so the IM 500 may have access to the certificates and related information.

Another example of a way that the IM 500 may gain access to the certificate of a service 604 involves the use of an agent, such as VM Tools by VMware, that may run on the VM 602 that hosts the service 604. Upon deployment, the agent running on the VM 602 hosting the service 604 may expose to the IM 500, or to the hypervisor 600 hosting the VM 602, information regarding the certificate.

In yet another approach to obtaining certificate information, an injection process may be performed in which the hypervisor 600 injects a certificate request directly via the virtualized network switch 606 on which the service 604 may be running. Since the network switch 606 may be directly accessed by the hypervisor 600, assurance may be had that there are no middleman entities between the switch 606 and VM 602 that could have compromised the service 604 certificate in some way.

A 'retrieve certificate' request may be one of the first requests used in the TLS handshake between the IM 500 and hypervisor 600. The IM 500 may have secure access to the virtual switch 606 by way of a port/port group, and may therefore inject a certificate request to the hypervisor 600 directly on that port. The certificate request may be sent internal to the hypervisor virtual switch 606, and so may be invulnerable to tampering. After retrieving the certificate, the hypervisor 600 may forward the certificate to the IM 500.

Thus, and with continued reference to FIG. 3, in one example embodiment, the IM 500 may, as shown at 1., transmit a request to the switch 606 that identifies an IP address xx.xx.xx.xx of a service, such as the service 604 for example. The switch 606 may, as shown at 2., then directly inject that request on a port of the hypervisor 600. Last, the hypervisor 600 may, as shown at 3., send the requested certificate for the service 604 to the IM 500.

In any of the aforementioned example approaches, the IM 500 may obtain the service 604 certificate in such a way that there is a complete and verifiable chain of custody of the certificate between the service 604 and the client that wishes to access the service 604. That is, the certificate may be verified as having been received from a trusted service, and avoidance of the use of 'middlemen' or other intervening actors or entities in the obtention of the certificate may provide assurance that the certificate is genuine and has not been tampered with.

D. Trust Broker in VPN Environment

As will be discussed now in connection with FIG. 4, the use of a TB in a virtual private network (VPN) may involve a somewhat different approach, relative to that employed in connection with, for example, the environment of FIG. 2. This difference in approach may be due to various factors, one example of which is that clients may not have access to a TB. That is, there may be a TB, but the TB is outside the VPN and so may not be accessible to clients within the VPN. Another example is that IP addresses may repeat themselves between VPNs or VLans/VxLans.

Figure 4:
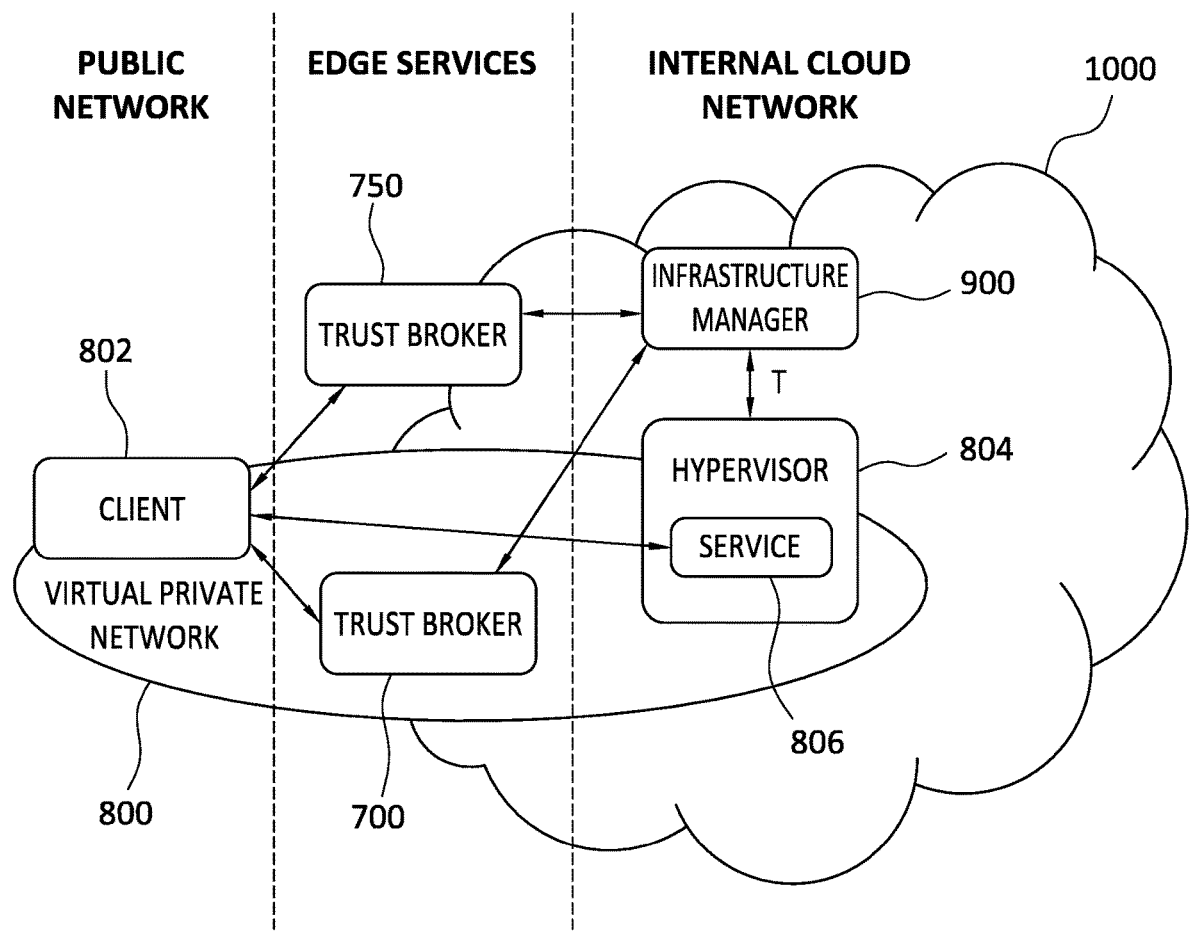
FIG. 4 discloses aspects of an example alternative environment.

In light of considerations such as these, and as shown in FIG. 4, some embodiments provide for an instance of a TB 700 that is specific to a VPN 800. Except as may be noted in the discussion of FIG. 4, the elements in that Figure may be configured, and operate, in the same way as the corresponding elements of FIG. 3. In the example of FIG. 4, the VPN 800 may also include one or more clients 802, and a hypervisor 804 that manages one or more services 806 to which the client 802 may need access. Similar to the configuration of FIG. 2, the hypervisor 804, along with a TB 750 and an IM 900, may be an element of a cloud environment 1000.

A number of the elements of the example of FIG. 4 may serve both VPN 800 clients, such as the client 802, and clients that are not part of the VPN 800. Further, some clients, such as the client 802, as well as the hypervisor 804, may operate both within the VPN 800, and external to the VPN 800. As such, some of these clients may access both TB 700 and TB 750, depending upon where and how the client is operating. As further indicated in FIG. 4, various operations and processes involving the client 802 may take place only within the VPN 800. For example, communications between the client 802 and TB 700, as well as communications between the client 802 and hypervisor 804, may take place within the VPN. Further, some components that are only elements of the VPN 800, such as the TB 700 for example, may nonetheless communicate with elements external to the VPN 800, such as the IM 900 for example.

With continued reference to the example of FIG. 4, it can be seen that the TB 700 is specific to the VPN 800, and as such may only be accessed by elements of the VPN 800. A VPN gateway (not shown), which may be running as an edge service inside the VPN 800, may provide the client 802 with information regarding the location of the TB 700. The TB 700 may communicate with the IM which, regardless of whether a TB, such as TB 700 and TB 750, is running inside or outside of the VPN 800, may be able to retrieve the service 806 certificate, such as by way of one of the example methods discussed in connection with FIG. 3. Running the TB 700 on the VPN 800 may ensure client 802 access, and also may ensure that resolution of the IP address of the service 806 is local to the VPN 800.

As noted in the discussion of the Figures then, and elsewhere herein, embodiments of the invention may provide for methods and processes for retrieving a certificate of a service in a trusted manner so that a client may verify that the certificate is issued by a service whose trustworthiness has been established by an independent third entity such as an IM. As well, embodiments may enable clients to access services with untrusted certificates or no certificates. Such access may be implemented automatically and without user intervention. To these ends, example embodiments may employed in VPNs, and in non-VPN environments. Embodiments may provide a trust broker that includes an API to retrieve or obtain a certificate associated with a service having an IP address specified by a client. Embodiments of the invention also embrace various methods and processes for obtaining the certificate of a service, including an injection method that may be implemented by a hypervisor, for example.

E. Example Methods

Figure 5:
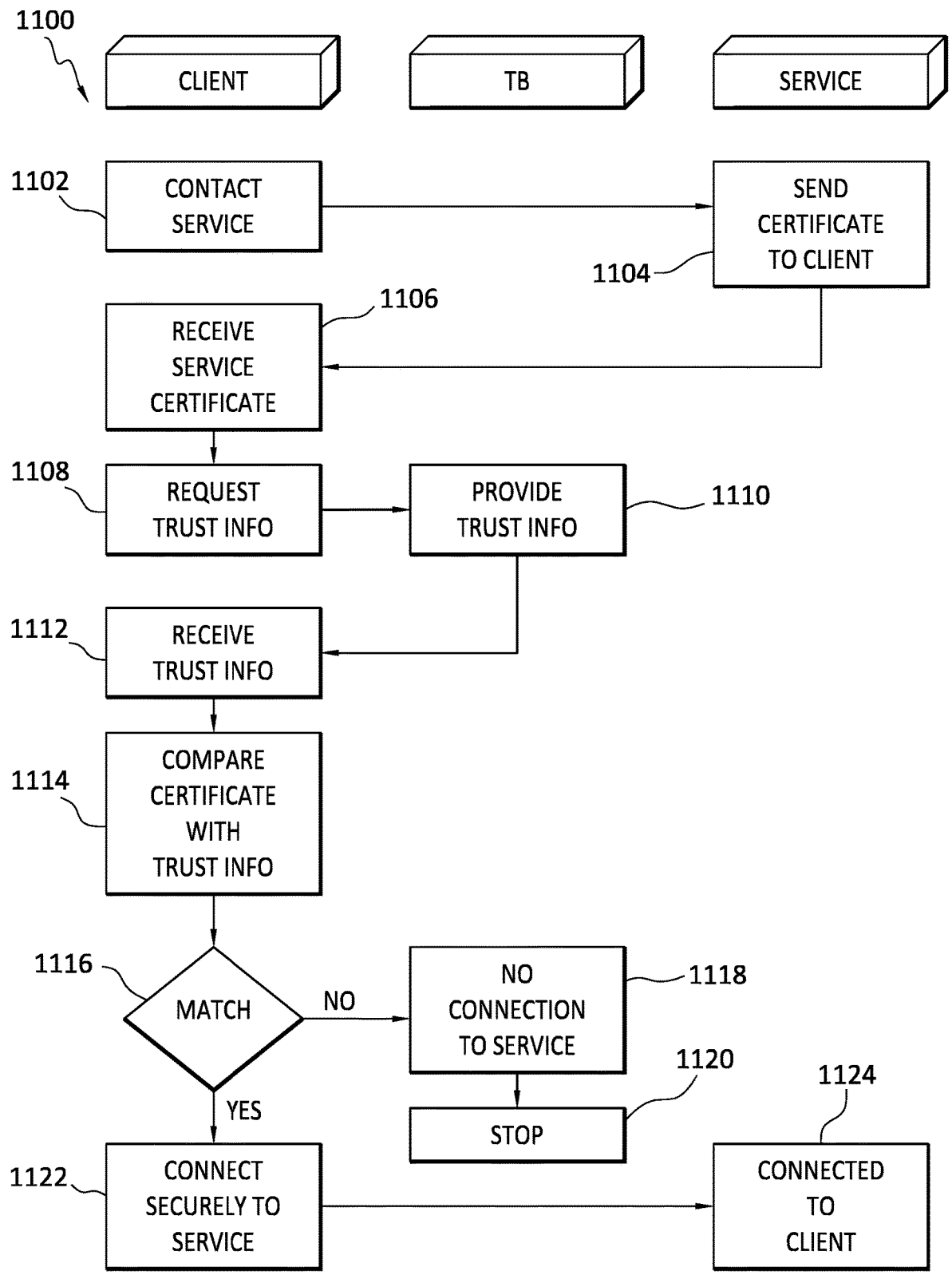
FIG. 5 discloses aspects of an example method for trust establishment.

With reference next to FIG. 5, methods are disclosed for trust establishment by escalation, where one example of such a method is denoted generally at 1100. The method 1100 may be cooperatively performed by various entities such as a client, TB, service, and IM, for example. However, the scope of the invention is not limited to performance of the method 1100 by any particular entity or group of entities and, accordingly, the example set forth in FIG. 5 is provided by way of illustration only.

The method 1100 may begin when a client contacts a service 1102. At this point, the client has not connected with the service 1102, but only initiated contact with the service. In response to the contact from the client 1102, the service may then send its certificate 1104 which is received by the client 1106. Note that in some embodiments, the client may not contact the service 1102 until after having received trust information 1112.

Because the client may not have the ability, information, or resources, to independently verify the service certificate, the client may request 1108 trust information from the TB. Because the certificate provided by the service 1104 may include the IP address of the service, the request 1108 to the TB may include an IP address provided by the service at 1104. In response to the request 1108, the TB may provide trust information 1110 to the requesting client. In general, the trust information may comprise any information that may enable the client to verify that the certificate received by the client from the service has been independently verified by an entity other than the service itself. The trust information may include, for example, an IP address of a service known to be trustworthy.

After the trust information has been received 1112 by the client, the client may then compare 1114 the certificate received 1106 from the service with the trust information. If the certificate is determined 1116 to not match the trust information, then the client may decide 1118 not to connect to the service, and the method 1100 may stop 1120. On the other hand, if the certificate is determined 1116 to match, or otherwise be consistent with, the trust information, the client may then connect 1122 to the service which is then connected 1124 with the client.

Figure 6:
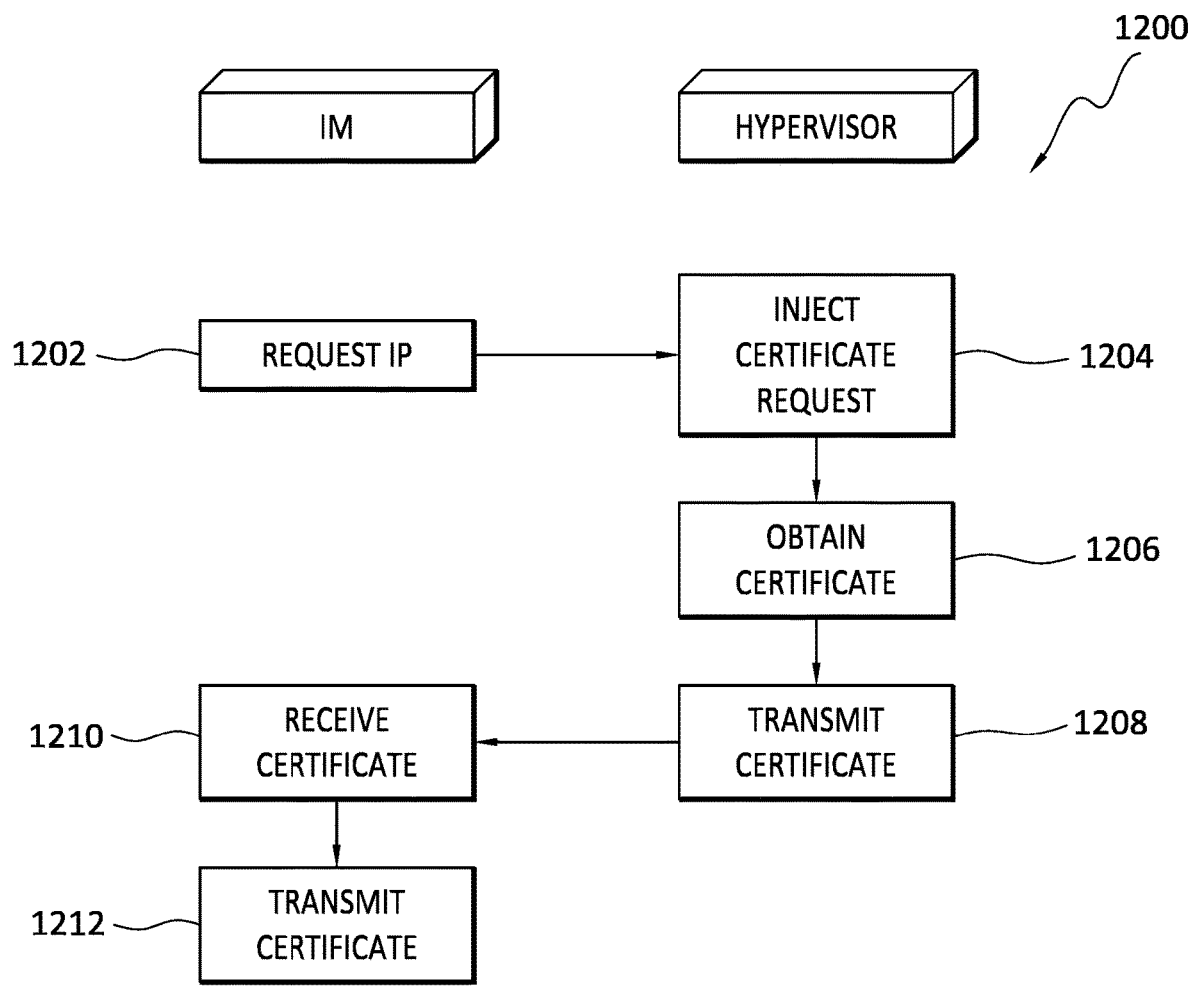
FIG. 6 discloses aspects of an example method for obtaining a certificate.

Turning now to FIG. 6, a method i disclosed for obtaining a certificate from a service, where one example of such a method is denoted generally at 1200. The method 1200 may be cooperatively performed by various entities such as an IM and a hypervisor, for example. However, the scope of the invention is not limited to performance of the method 1200 by any particular entity or group of entities and, accordingly, the example set forth in FIG. 6 is provided by way of illustration only. It is noted that the method of FIG. 6 may be omitted in a case where the IM already has the certificate of a service to which a client wishes to connect. Examples of such cases are disclosed elsewhere herein.

Finally, and with reference to the example methods of FIGS. 5 and 6 which involve the use of a certificate, it is noted that the certificate is one example of a credential or information that (i) uniquely identifies a particular service, (ii) can be verified as trustworthy, or not, by an IM, and (iii) can be evaluated by a client. Thus, the scope of the invention is not limited to the use of certificates as a mechanism for establishing trust between/among entities. Rather, certificates are disclosed only by way of example and as such are not intended to limit the scope of the invention in any way. As well, the use of an IP address as a unique identifier for a particular service is provided only by way of example, and any other information that uniquely identifies a service may alternatively be employed. Such other information that may serve as a unique identifier for a service includes, for example, Fully Qualified Domain Names (FQDN), network names, and IP portal (IP+port).

With particular reference now to FIG. 6, the method 1200 may begin when the IM requests 1202, from a hypervisor, the identification of a service corresponding with an IP address. The IP address may have been received by the IM from a client by way of a TB, and the IP address may be identified in the request 1202. The request 1202 by the IM may be in response to a communication from a TB which, in turn, may have received a client request for trust information. In other cases, the request 1202 may not be made in connection with any particular event. For example, the IM may keep a record of service IP addresses, and only submit request 1202 when a new service has been spun up for which the IM does not yet have an IP address.

After receipt of the request 1202, the hypervisor may inject 1204 the request directly into a port that communicates with the service identified in the request 1202. The hypervisor 1204 may then obtain the certificate 1206, such as by retrieving the certificate, and then transmit 1208 the requested certificate to the IM. The IM may then receive the certificate 1210, and transmit the certificate 1212 to a client for use by the client in verifying a certificate provided by a service to which the client wishes to connect.

F. Further Example Embodiments

Following are some further example embodiments of the invention. These are presented only by way of example and are not intended to limit the scope of the invention in any way.

Embodiment 1. A method, comprising: contacting, by a client, a service; receiving a credential from the service; obtaining trust information from a trust broker; comparing the credential with the trust information; and either: connecting to the service if the credential and trust information match; or declining to connect to the service if the credential and the trust information do not match.

Embodiment 2. The method as recited in embodiment 1, wherein other than by way of the trust information obtained from the trust broker, the client has no way to verify whether or not the service can be trusted.

Embodiment 3. The method as recited in any of embodiments 1-2, wherein the trust information comprises an IP address of the service.

Embodiment 4. The method as recited in any of embodiments 1-3, wherein the trust broker is an edge service running in a cloud environment that also hosts the service.

Embodiment 5. The method as recited in any of embodiments 1-4, wherein the trust broker is an element of a virtual private network and is not accessible by clients outside the virtual private network.

Embodiment 6. The method as recited in any of embodiments 1-5, wherein the trust information is obtained by the trust broker from an infrastructure manager of a cloud environment in which the service runs.

Embodiment 7. The method as recited in embodiment 6, wherein the trust information is obtained by the infrastructure manager from a hypervisor that manages operation of the service.

Embodiment 8. The method as recited in any of embodiments 1-7, wherein the trust information is obtained by the client by way of a plurality of connections, and all of the connections are trusted connections.

Embodiment 9. The method as recited in any of embodiments 1-8, wherein the service runs on a virtual machine in a cloud environment.

Embodiment 10. The method as recited in any of embodiments 1-9, wherein the credential is a certificate that includes an IP address of the service.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
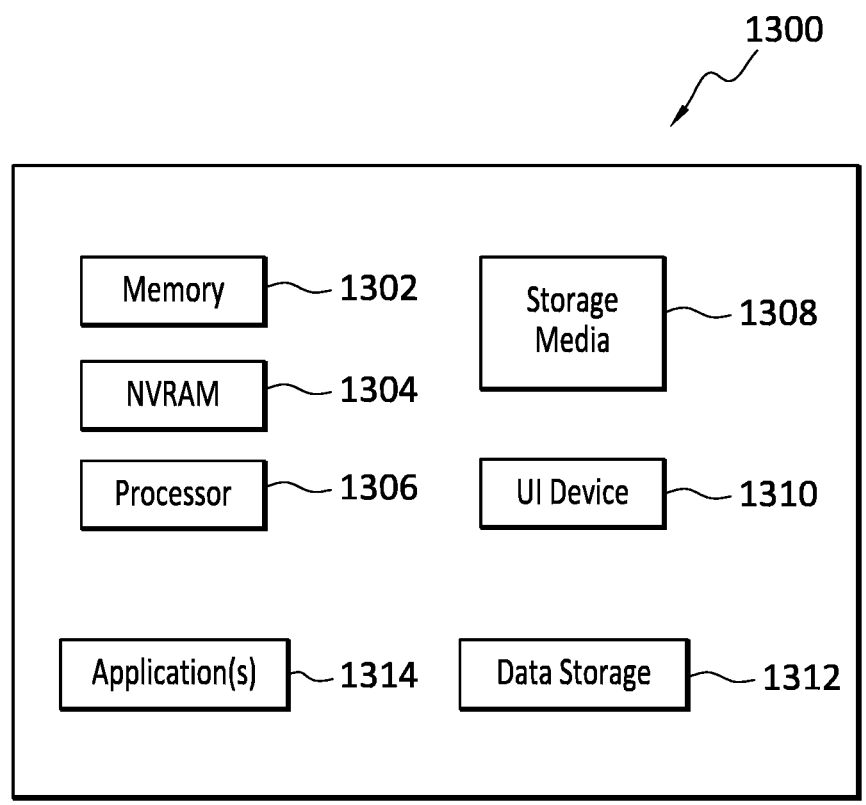
FIG. 7 discloses aspects of an example computing entity.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 1300. As well, where any of the aforementioned elements comprise or consist of a virtual machine (VM), that VM may constitute a virtualization of any combination of the physical components disclosed in FIG. 7.

In the example of FIG. 7, the physical computing device 1300 includes a memory 1302 which may include one, some, or all, of random access memory (RAM), non-volatile memory (NVM), such as non-volatile random access (NVRAM) 1304, read-only memory (ROM), and persistent memory, one or more hardware processors 1306, non-transitory storage media 1308, UI device 1310, and data storage 1312. One or more of the memory components 1302 of the physical computing device 1300 may take the form of solid state device (SSD) storage. As well, one or more applications 1314 may be provided that comprise instructions executable by one or more hardware processors 1306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
  contacting, by a client, a service;
  receiving a credential from the service;
  obtaining trust information from a trust broker, wherein the trust information is obtained by the trust broker from an infrastructure manager of a cloud environment in which the service runs;
  comparing the credential with the trust information; and either:
    connecting to the service if the credential and trust information match; or
    declining to connect to the service if the credential and the trust information do not match.

2. The method as recited in claim 1, wherein other than by way of the trust information obtained from the trust broker, the client has no way to verify whether or not the service can be trusted.

3. The method as recited in claim 1, wherein the credential is a certificate that includes a unique identifier of the service.

4. The method as recited in claim 1, wherein the trust information comprises a unique identifier of the service.

5. The method as recited in claim 1, wherein the trust broker is an edge service running in a cloud environment that also hosts the service.

6. The method as recited in claim 1, wherein the trust broker is an element of a virtual private network and is not accessible by clients outside the virtual private network.

7. The method as recited in claim 1, wherein the infrastructure manager communicates with the service entirely within the cloud environment.

8. The method as recited in claim 1, wherein the trust information is obtained by the infrastructure manager from a hypervisor that manages operation of the service.

9. The method as recited in claim 1, wherein the trust information is obtained by the client by way of a plurality of connections, and all of the connections are trusted connections.

10. The method as recited in claim 1, wherein the service runs on a virtual machine in a cloud environment.

11. A non-transitory storage medium having stored therein instructions that are executable by one or more hardware processors to perform operations comprising:
    obtaining trust information from a trust broker, wherein the trust information is obtained by the trust broker from an infrastructure manager of a cloud environment in which the service runs;
    comparing the credential with the trust information; and
    either:
        connecting to the service if the credential and trust information match; or
        declining to connect to the service if the credential and the trust information do not match.

12. The non-transitory storage medium as recited in claim 11, wherein other than by way of the trust information obtained from the trust broker, the client has no way to verify whether or not the service can be trusted.

13. The non-transitory storage medium as recited in claim 11, wherein the credential is a certificate that includes a unique identifier of the service.

14. The non-transitory storage medium as recited in claim 11, wherein the trust information comprises a unique identifier of the service.

15. The non-transitory storage medium as recited in claim 11, wherein the trust broker is an edge service running in a cloud environment that also hosts the service.

16. The non-transitory storage medium as recited in claim 11, wherein the trust broker is an element of a virtual private network and is not accessible by clients outside the virtual private network.

17. The non-transitory storage medium as recited in claim 11, wherein the infrastructure manager communicates with the service entirely within the cloud environment.

18. The non-transitory storage medium as recited in claim 11, wherein the trust information is obtained by the infrastructure manager from a hypervisor that manages operation of the service.

19. The non-transitory storage medium as recited in claim 11, wherein the trust information is obtained by the client by way of a plurality of connections, and all of the connections are trusted connections.

20. The non-transitory storage medium as recited in claim 11, wherein the service runs on a virtual machine in a cloud environment.

\* \* \* \* \*